United States Patent [19]

Frederick

[11] Patent Number: 4,536,995
[45] Date of Patent: Aug. 27, 1985

[54] CORNER PANEL ASSEMBLY

[76] Inventor: Russell A. Frederick, 74 Walnut St., Milford, Conn. 06460

[21] Appl. No.: 623,354

[22] Filed: Jun. 22, 1984

[51] Int. Cl.³ .............................................. E04F 19/00
[52] U.S. Cl. ......................................... 52/27; 52/277; 52/278; 248/220.1; 403/205; 403/403
[58] Field of Search ................. 52/277, 278, 287, 288, 52/DIG. 13, 27, 173 R; 248/220.1, 343; 403/205, 403

[56] References Cited

U.S. PATENT DOCUMENTS

| 939,005 | 11/1909 | Goedeke | 248/220.1 |
|---|---|---|---|
| 1,380,518 | 6/1921 | Bellig | 248/220.1 |
| 1,919,300 | 7/1933 | Lewis | 52/287 |
| 2,279,755 | 4/1942 | Lemen et al. | 52/288 |
| 3,302,350 | 2/1967 | Brown et al. | 52/287 |

FOREIGN PATENT DOCUMENTS

| 930544 | 7/1955 | Fed. Rep. of Germany | 52/288 |
|---|---|---|---|
| 429917 | 6/1935 | United Kingdom | 52/288 |

Primary Examiner—J. Karl Bell
Assistant Examiner—Creighton Smith
Attorney, Agent, or Firm—Cifelli, Frederick & Tully

[57] ABSTRACT

A corner panel assembly (for mounting items such as speakers in a corner of a room where two walls and the ceiling converge) comprises a generally triangular mounting frame including three side pieces connected by corner brackets. The side pieces are V-shaped, having an outer panel leg and a wall leg extending from the back thereof at acute angle, wherein the wall leg is secured to the walls and ceilings adjacent to corner. A front panel is removably secured to the panel legs of the side pieces of the mounting frame, such as by Velcro, quarter-turn fasteners, or other means. The mounting frame is mounted in a corner, and the item desired to be mounted is secured to mounting panel, whereafter the mounting panel is secured to the mounting frame, concealing the frame unobtrusively utilizing the space of the corner.

12 Claims, 5 Drawing Figures

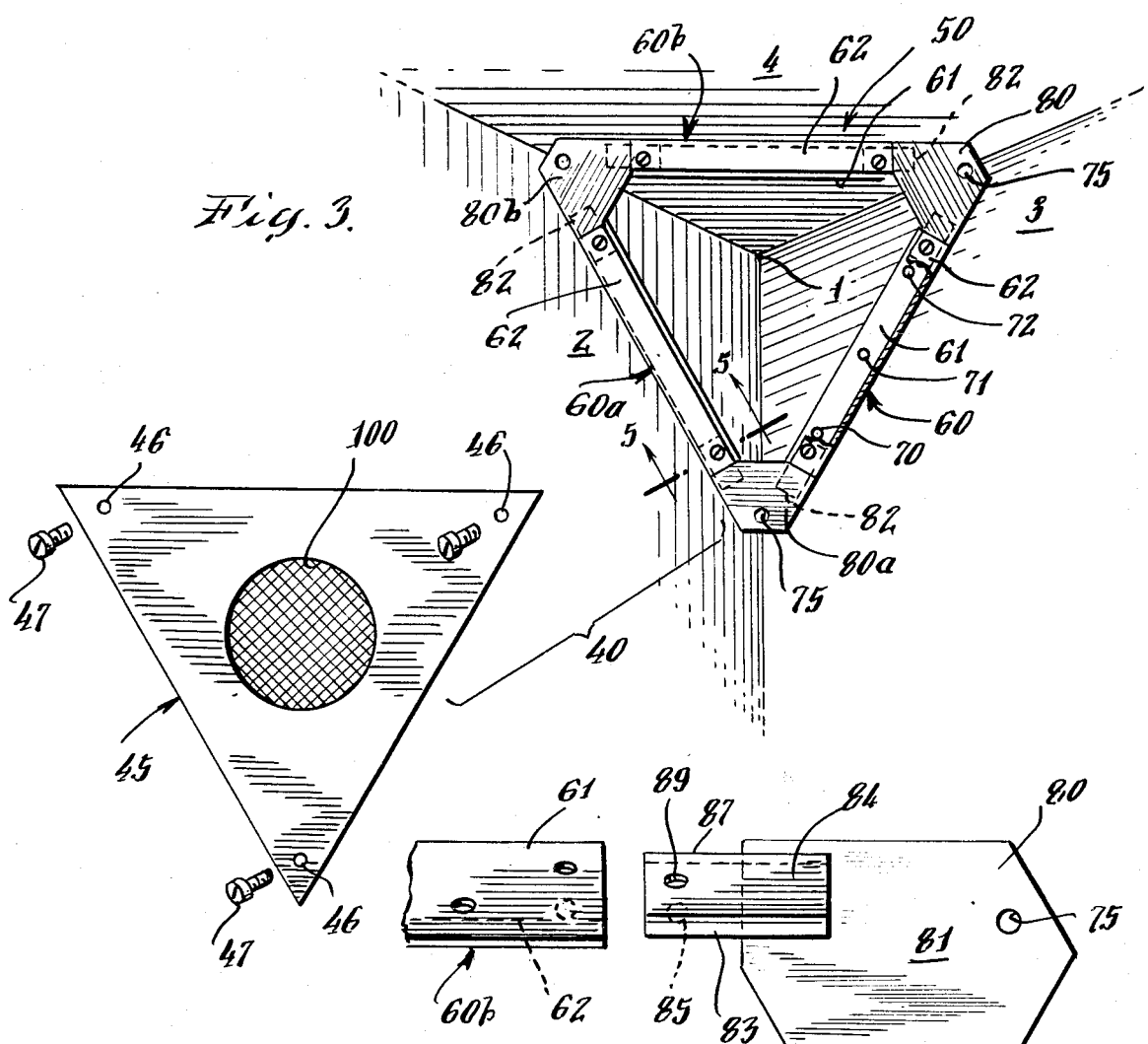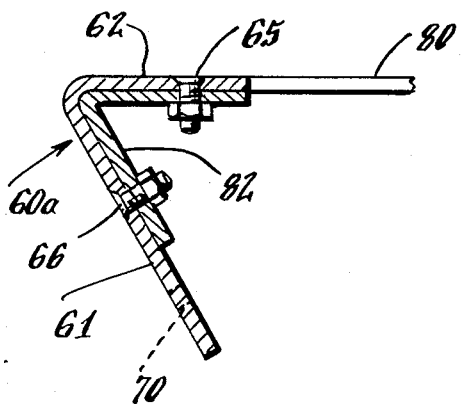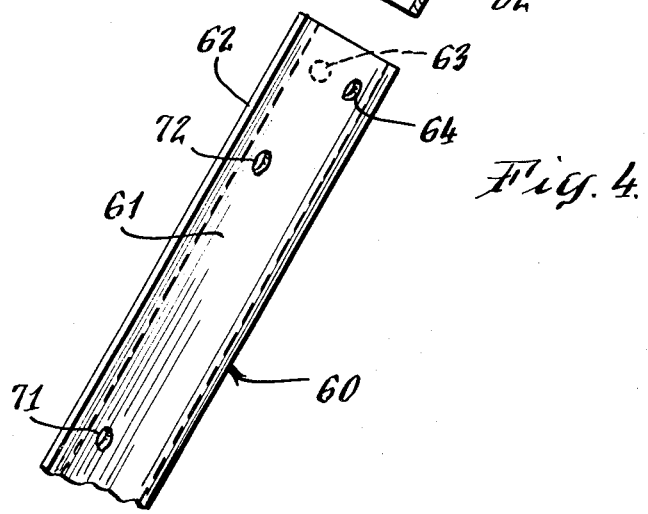

CORNER PANEL ASSEMBLY

FIELD OF INVENTION

The invention herein relates to a corner panel assembly for mounting in a corner of a room, usually an upper corner where two walls and the ceiling converge, the mounting panel assembly being adapted for mounting a speaker, lighting fixture, or various other items.

BACKGROUND OF INVENTION

The upper corners of rooms, where two walls and a ceiling converge, define space which is seldom utilized in any useful manner. Meanwhile, the walls adjacent corners are used to mount items which protrude from and often appear clumsy when mounted on a flat surface. Examples of such mounted items are speakers, some lighting fixtures including emergency lighting fixtures, property protection equipment such as a smoke detector.

Accordingly, there is a need for some means to mount items in a corner, in order to achieve better space utilization and a more aesthetic appearance.

SUMMARY OF INVENTION

A corner panel assembly according to the invention herein generally comprises a triangular mounting frame adapted for mounting in a corner, the mounting frame having a panel removably secured thereto. The panel itself may support a speaker or various other items.

More particularly, the mounting frame comprises three side pieces, each having a V-shaped cross-section, one leg of the "V" being a wall leg and the other a panel leg. The mounting frame is secured in a corner by securing the wall legs of the side pieces to the walls and ceiling adjacent the corner, using fasteners such as screws (with screw-receiving inserts if necessary) or molly bolts. The corner panel is triangular in shape and has its marginal edges secured to the panel legs of the mounting frame side pieces by means of a releasable securement, which may be statistical loop fasteners, quarter-turn fasteners, or other threaded fasteners. The side pieces of the triangular mounting frame may be integrally joined at the three corners of the frame. Alternatively, a separate corner bracket with side piece engaging means may be provided at each corner. This latter structure permits the use of side pieces of various sizes in combination with a standardized corner bracket.

Accordingly, a principal object of the invention is to provide for better utilization of corners, and more particularly to provide a corner panel assembly for mounting various items in a corner.

Another object of the invention herein is to provide a corner panel assembly which is easily and securely mounted in a corner.

A further object of the invention herein is to provide a corner panel assembly which is aesthetically pleasing.

Another additional object of the invention herein is to provide a corner panel assembly which is adaptable to various sizes.

Other and more specific features and objects of the invention herein will in part be obvious and will in part appear from a perusal of the following description of the preferred embodiments and the claims, taken together with the drawings.

DRAWINGS

FIG. 3 is an exploded perspective view of another corner panel assembly according to the invention herein;

FIG. 4 is a rear view of one corner of the corner panel assembly of FIG. 3 shown disassembled; and FIG. 5 is a partial sectional view of the corner panel assembly of FIG. 3 taken along the lines 5—5 of FIG. 3.

The same reference numerals refer to the same elements throughout the various Figures.

DESCRIPTION OF PREFERRED EMBODIMENTS

Figure 1:
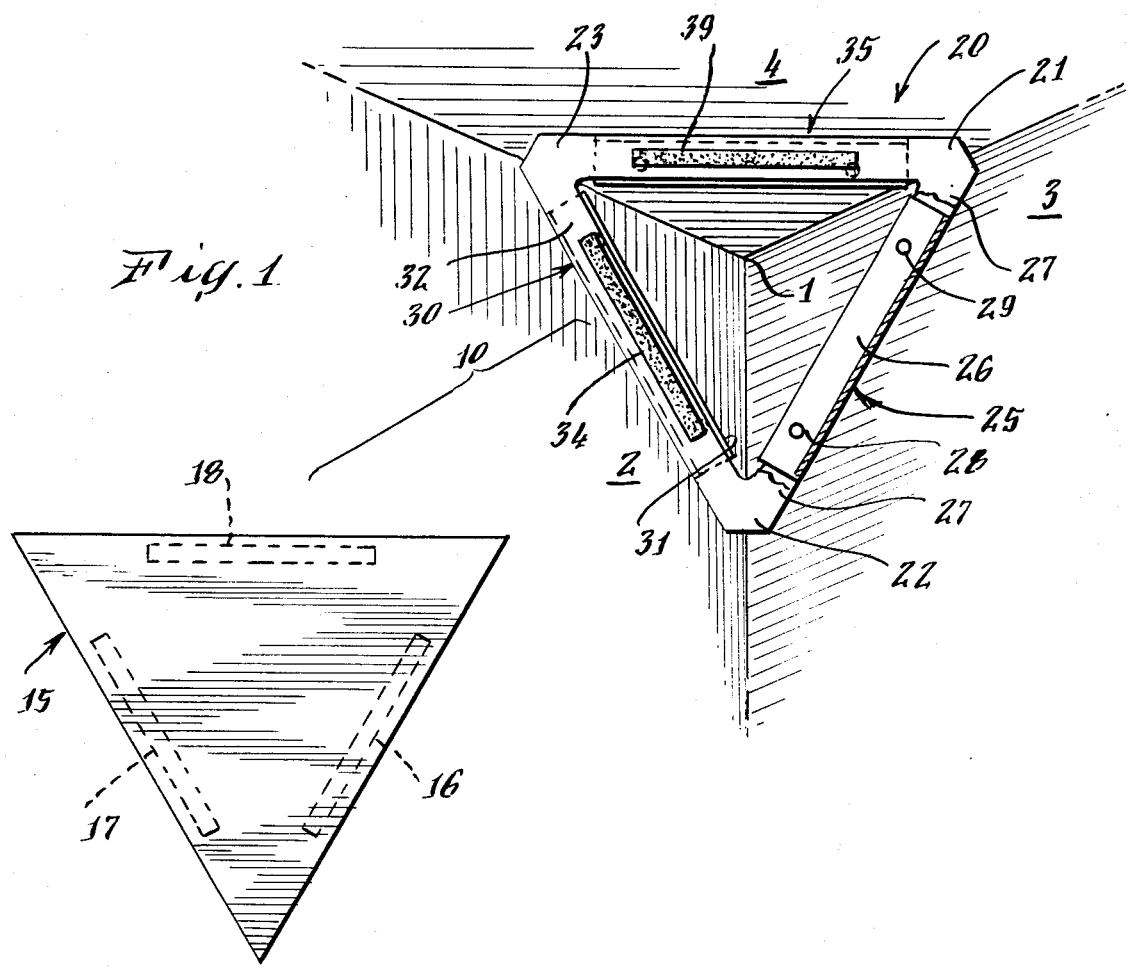
FIG. 1 is an exploded perspective view of a corner panel assembly according to the invention herein.
Figure 2:
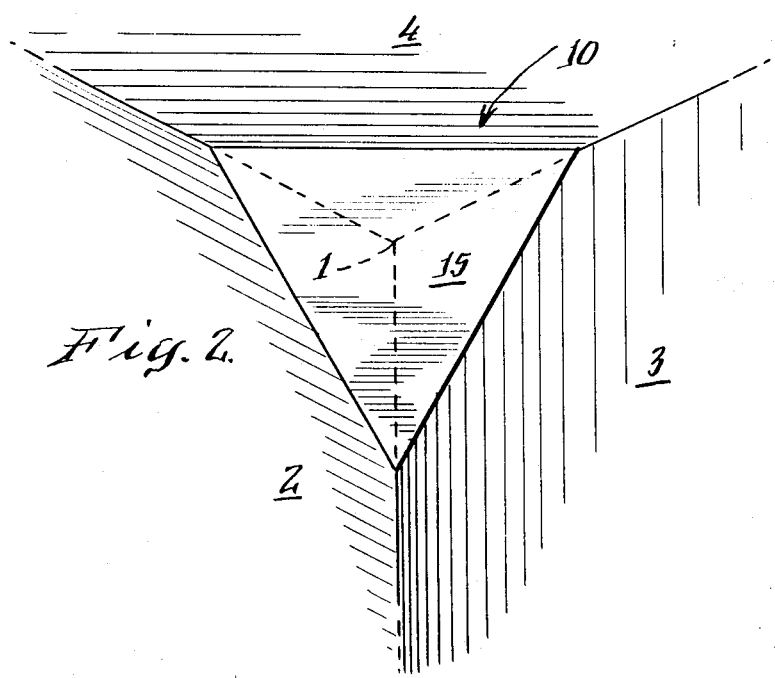
FIG. 2 is a perspective view of the corner panel assembly of FIG. 1.

With reference to FIGS. 1 and 2, a first corner panel assembly 10 according to the invention herein is illustrated. The corner panel assembly 10 is installed in the upper corner of a room, the corner itself being designated at 1 and being the point of convergence of walls 2, 3 and ceiling 4.

The corner panel assembly 10 generally comprises a mounting frame 20 and a triangular front panel 15 secured to the mounting frame 20 by securement means. The mounting frame 20 comprises three side pieces 25, 30 and 35 which are joined by integral corners 21, 22 and 23. Each side piece is V-shaped when viewed in cross-section, and has a wall leg and a panel leg. Side piece 25 is cut away to better reveal its wall leg 26, and only a portion of its panel leg 27 is seen adjacent the corner 21. With respect to side piece 30, its panel leg 32 is shown in full and only the marginal edge of its wall leg 31 is revealed adjacent the panel leg 32. The corners are coplanar with the panel legs of side pieces 25, 30, 35, and the "points" of the corners are preferably rounded or truncated.

The wall legs are provided with openings, e.g. openings 28 and 29 of wall leg 26 of side piece 25, through which fasteners may be inserted and secured into operative engagement with the wall behind the wall leg. The fasteners may be simple screws, and the wall may be provided with expansible receptacles for the screws, if desired. If a heavier load is to be carried by the corner panel, it can be installed with molly bolts. It will be appreciated that each of the legs 25, 30 and 35 is preferably respectively secured to the wall (or ceiling) surface against which it lies.

The triangular front panel 15 is secured to the mounting frame by releasable securement means, which in the embodiment shown is statistical loop fasteners sold under the trademark Velcro. Two strips 34, 39 of the fastener material are respectively secured to the outwardly facing surface of the panel legs of side pieces 30 and 35, and a third strip of Velcro is secured to panel leg 27 of side piece 25, although it is not seen in FIG. 1 because that panel leg is cut away. Cooperating strips of the statistical loop fastener 16, 17 and 18 are attached to the marginal rear surface of the panel 15, these strips being in position to engage the strips on the mounting frame when the corner panel is registered therewith. This provides for removably mounting the corner panel 15 to the mounting frame 20, and with reference to FIG. 2, the complete corner panel assembly 10 is shown installed with only the corner panel 15 visible. The corner panel assembly 10 provides for mounting items either to or through the panel 15 such that they do not intrude into the room, and provides a smooth and attractive transition of surfaces in place of the usual corner.

The mounting frame 20 may be molded of plastic, or may be fabricated of metal, as desired. Other securement means, including screws, may be used, particularly if a heavy load is to be carried.

With reference to FIGS. 3-5, another corner panel assembly 40 according to the invention herein is illustrated. The corner panel assembly 40 generally comprises a triangular front panel 45 and a mounting frame 50. The mounting frame 50 differs from the mounting frame 20 described above in that it is made up of side pieces 60, 60a and 60b and corner brackets 80, 80a and 80b secured together to form the mounting frame 50.

The structure of the corner bracket 80 and the adjacent side pieces 60 and 60b is illustrated in FIGS. 4 and 5. The side leg 60 has a wall leg 61 and a panel leg 62, the wall leg being shown in the foreground in FIG. 4 because FIG. 4 is a rear view. The corner bracket 80 comprises a generally triangular plate 81 having mounting stubs 82 and 87 secured thereto for mounting the adjacent side pieces 60 and 60b. The mounting stub 82 is V-shaped when viewed in cross-section, having a panel side leg 83 and a wall side leg 84. The panel side leg 83 is secured to the plate 81, such as by spot welding. The wall side legs are each provided with an opening 89, seen on mounting stub 87, and the panel side legs are each provided with an opening 85. The side pieces 60 and more particularly the panel leg 62 thereof is provided with an opening 63 which registers with the opening 85, for receiving a bolt 65 or equivalent fastener as seen in FIG. 5 for an adjacent corner. Similarly, wall leg 61 of the side piece is provided with an opening 64 registering with the other opening in the mounting stub, for also receiving a screw or bolt 66, as shown in FIG. 5. Thus, the side piece 60 may be securely attached to the corner bracket 80 to from the triangular mounting frame, and the other side pieces and corner brackets are similarly screwed together.

This formation of the mounting frame from individual parts is advantageous in that the size of the mounting frame can be altered by merely altering the length of the side pieces, utilizing the same corner brackets. The side pieces are provided with further openings in the wall legs thereof, the openings 70 - 72 being visible in FIG. 1 on side piece 60. These openings receive fasteners which extend into the wall behind the side piece, for securing the mounting frame to the adjacent wall (or ceiling) surface. Each of the corner brackets may be provided with an opening 75, and the corresponding corners of the triangular front panel 45 may be provided with openings 46, for attaching the front panel to the mounting frame by screws 47.

The front panel 45 is shown mounting a speaker 100, illustrating one of the many uses of a corner panel assembly 40. The corner panel assembly has been shown with an equilateral triangular front panel and mounting frame, but may be constructed as an isosceles triangle, if desired.

Accordingly, there have been described several corner panel assemblies which admirably achieve the objects of the invention herein. It will be appreciated that various changes may be made from the preferred embodiments described without departing from the spirit and scope of the invention, which is limited only by the following claims.

I claim:

1. A corner panel assembly for mounting in a corner of a room, where two walls and the ceiling converge, the corner panel assembly comprising:
   (A) a generally triangular mounting frame having three side pieces connected by corner brackets at their adjacent ends, the side pieces being V-shaped in crosssection and each having a panel leg deployed in one plane and a wall leg extending from the panel legs at an acute angle such that a wall leg lies substantially flat against the wall and ceiling surfaces, the wall legs adapted to receive fasteners for securing the wall legs to the adjacent wall and ceiling and thereby mounting the mounting frame in the corner;
   (B) a generally triangular front panel sized to be received on and conceal the generally triangular mounting frame, with the marginal edges of the rear surface of the front panel being disposed against the panel legs of the side pieces; and
   (C) securement means removably securing the front panel to the triangular mounting frame,
   whereby the corner panel is adapted to mount items such as speakers, or security devices and the entire corner panel assembly mounts such devices in a corner of a room.

2. A corner panel assembly as defined in claim 1 wherein the side pieces and corner brackets of the triangular mounting frame are formed in one integral mounting frame.

3. A corner panel assembly as defined in claim 2 wherein the mounting frame is fabricated of plastic.

4. A corner panel assembly as defined in claim 2 wherein the mounting frame is formed of metal.

5. A corner panel assembly as defined in claim 1 wherein the generally triangular mounting frame and generally triangular panel are equilateral triangles.

6. A corner panel assembly as defined in claim 1 wherein the generally triangular mounting frame and generally triangular panel are isosceles triangles.

7. A corner panel assembly as defined in claim 1, wherein the securement means is a two-piece statistical loop fastener, one piece of which is deployed on each of the panel legs of each of the side pieces and another piece of which is deployed on each of the marginal rear surfaces of the front panel.

8. A corner panel assembly as defined in claim 1 wherein generally triangular mounting frame is rounded or truncated at the corners thereof, to compensate for irregularities in the joinder of the walls and ceiling defining a corner.

9. A corner panel assembly as defined in claim 1 wherein the mounting frame is fabricated of three individual side pieces and three individual corner brackets removably connected together into the generally triangular mounted frame.

10. A corner panel assembly as defined in claim 9 wherein the corner brackets comprise a plate having two mounting stubs secured to the back thereof, the mounting stubs each having a shape complimentary to and receiving the ends of the side pieces, wherein the side pieces are secured to the mounting stubs.

11. A corner panel assembly as defined in claim 10 wherein the side pieces are secured to the mounting stubs of the corner brackets by threaded fasteners.

12. A corner panel assembly as defined in claim 1 wherein the securement means are threaded fasteners.

* * * * *